(No Model.)  8 Sheets—Sheet 1.
G. F. LEIGER.
PNEUMATIC SHEET SEPARATING AND FEEDING MACHINE.

No. 588,451.  Patented Aug. 17, 1897.

Witnesses  Inventor
Wm. F. Huning  George F. Leiger
Wm. M. Rheem  by Bond, Adams, Pickard & Jackson
  his Attys.

(No Model.) 8 Sheets—Sheet 3.
G. F. LEIGER.
PNEUMATIC SHEET SEPARATING AND FEEDING MACHINE.
No. 588,451. Patented Aug. 17, 1897.

Witnesses
Wm. J. Henning
Wm. M. Rheem

Inventor
George F. Leiger
by Bond, Adams, Pickard & Jackson
his Att'ys

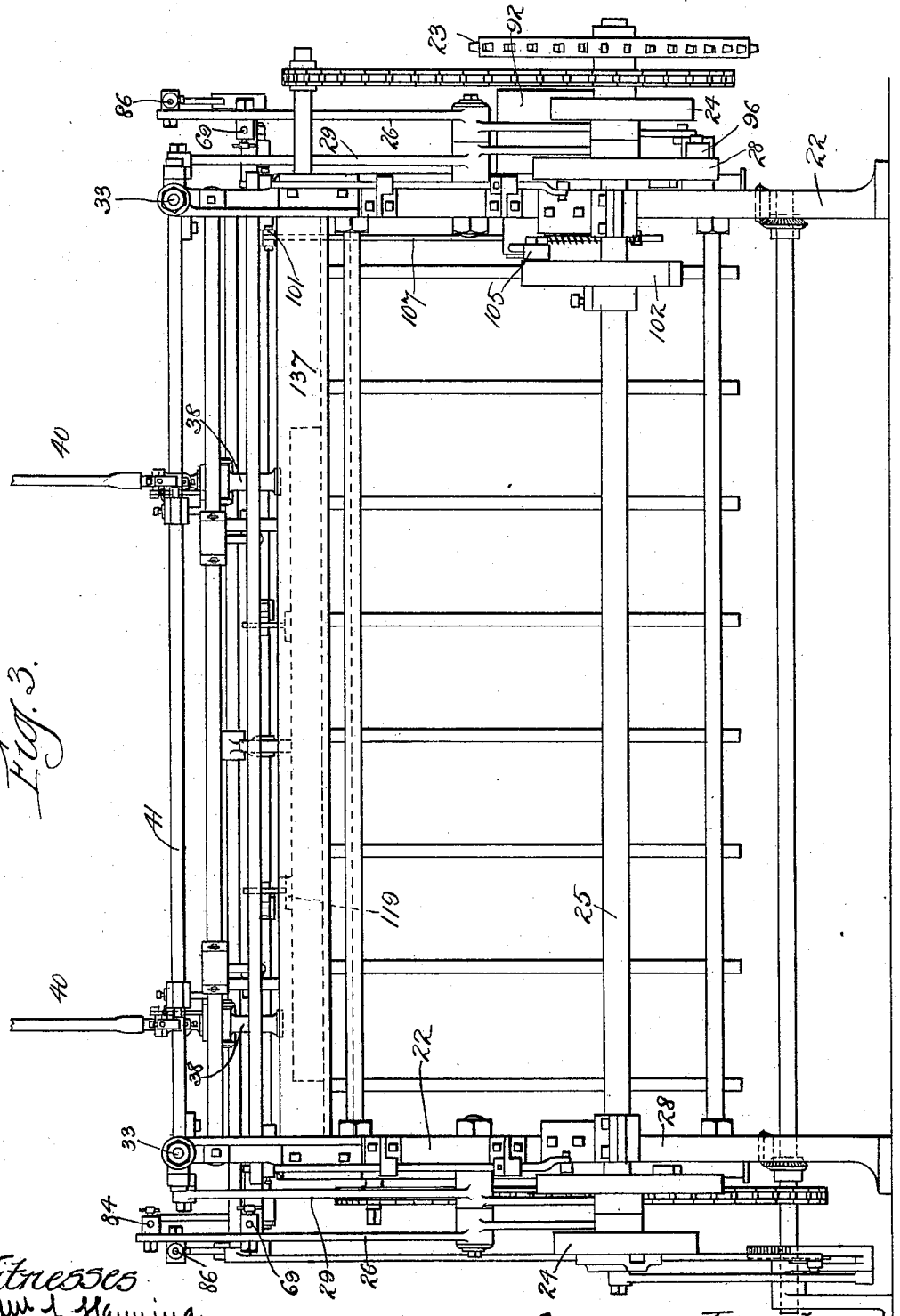

(No Model.) 8 Sheets—Sheet 5.
G. F. LEIGER.
PNEUMATIC SHEET SEPARATING AND FEEDING MACHINE.
No. 588,451. Patented Aug. 17, 1897.
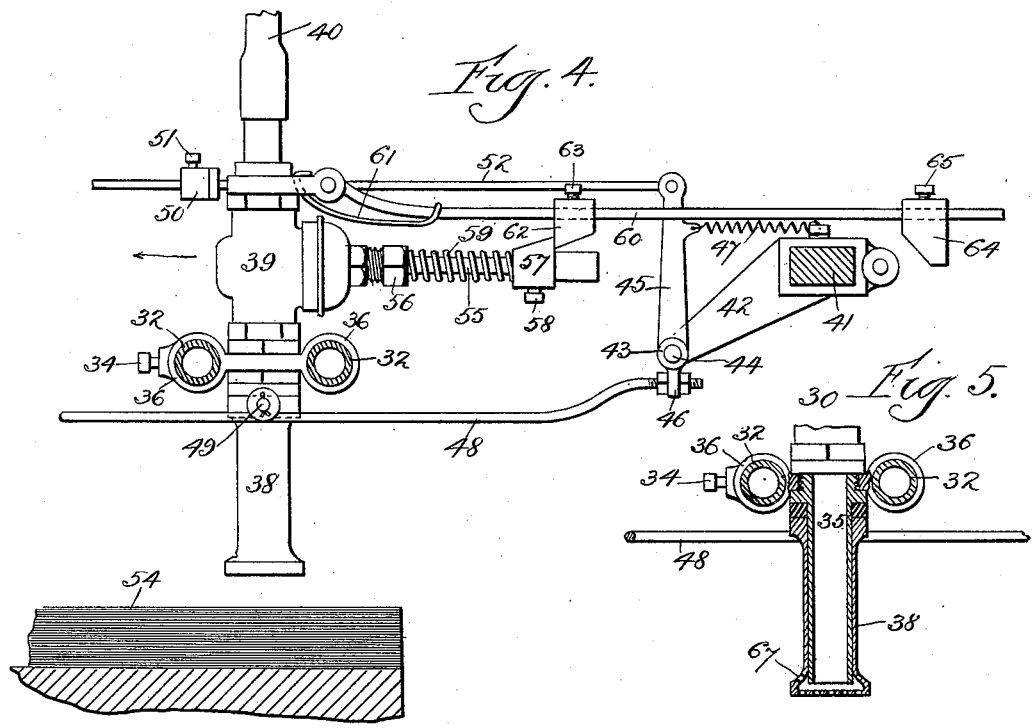
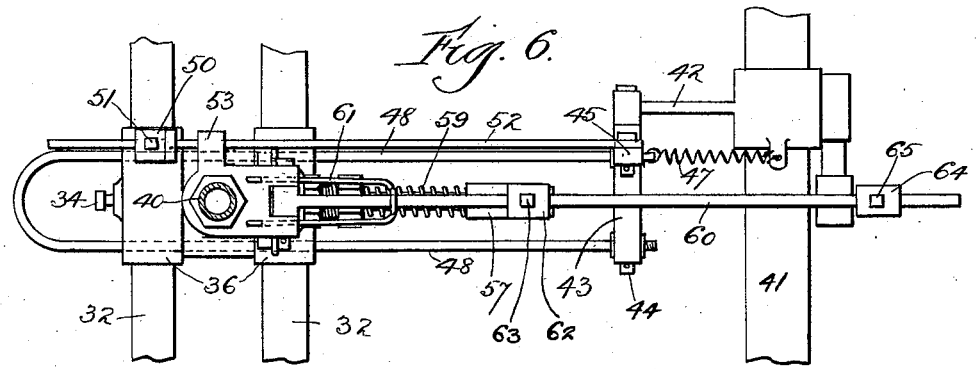
Witnesses  
Inventor,  
George F. Leiger  
his Attys (No Model.) 8 Sheets—Sheet 6.
G. F. LEIGER.
PNEUMATIC SHEET SEPARATING AND FEEDING MACHINE.
No. 588,451. Patented Aug. 17, 1897.
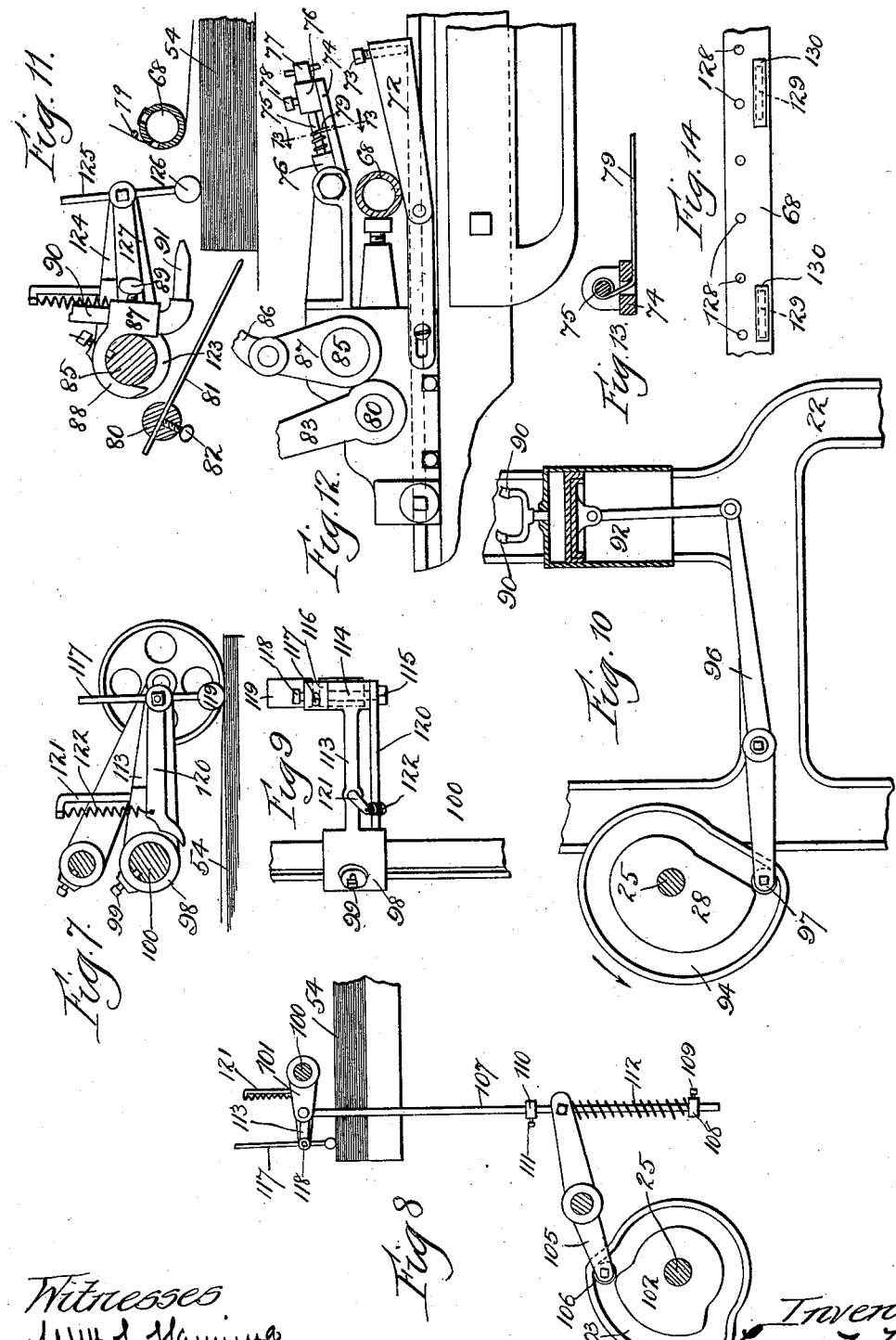

(No Model.) 8 Sheets—Sheet 8.
G. F. LEIGER.
PNEUMATIC SHEET SEPARATING AND FEEDING MACHINE.
No. 588,451. Patented Aug. 17, 1897.
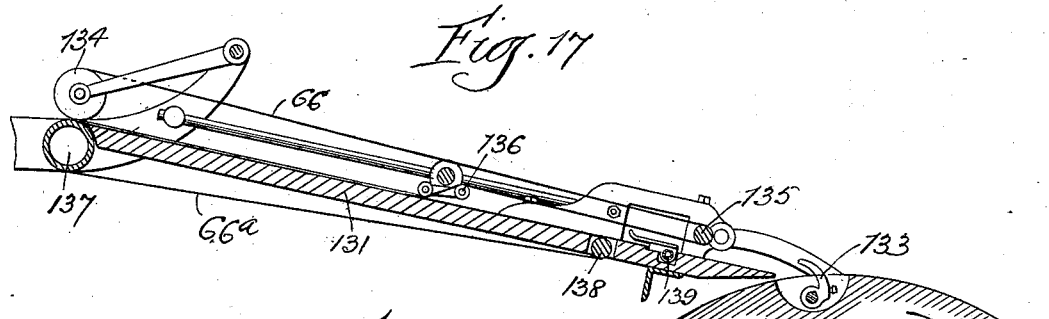
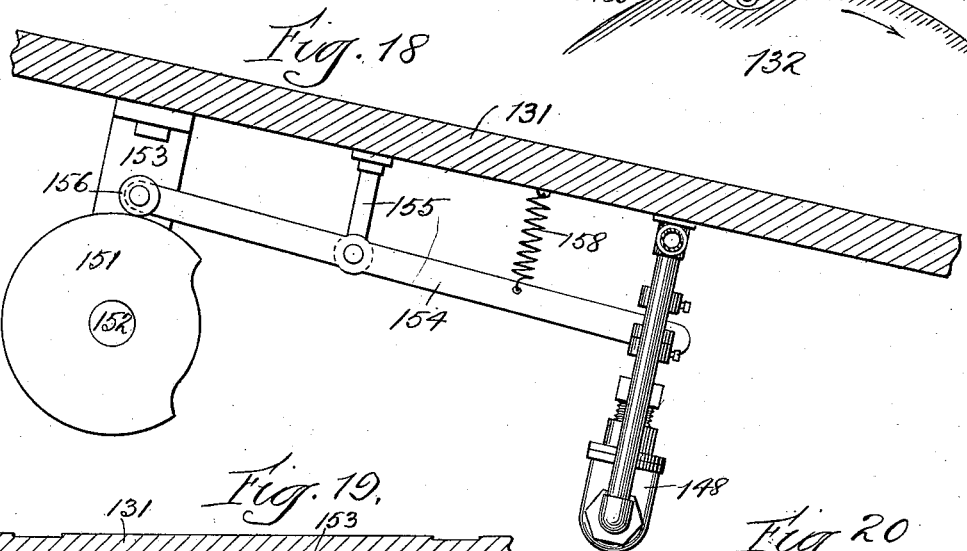
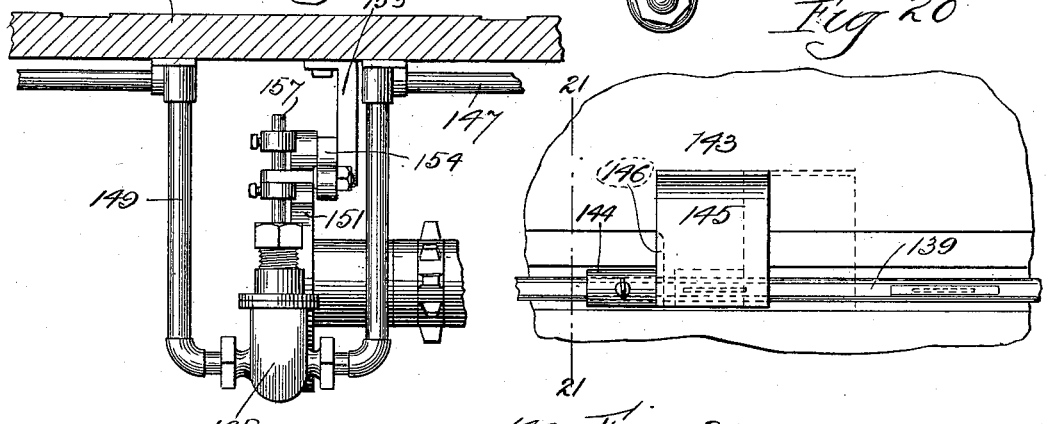
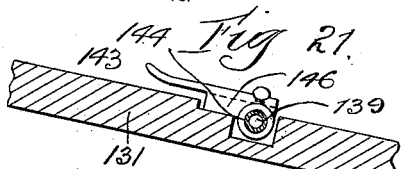

UNITED STATES PATENT OFFICE.

GEORGE F. LEIGER, OF CHICAGO, ILLINOIS, ASSIGNOR, BY DIRECT AND MESNE ASSIGNMENTS, TO HIMSELF AND LEWIS BENEDICT, OF SAME PLACE.

PNEUMATIC SHEET SEPARATING AND FEEDING MACHINE.

SPECIFICATION forming part of Letters Patent No. 588,451, dated August 17, 1897.

Application filed March 13, 1896. Serial No. 583,127. (No model.)

*To all whom it may concern:*

Be it known that I, GEORGE F. LEIGER, a citizen of the United States, residing in Chicago, in the county of Cook and State of Illinois, have invented certain new and useful Improvements in Pneumatic Sheet Separating and Feeding Machines, of which the following is a specification, reference being had to the accompanying drawings, in which—

Figure 1:
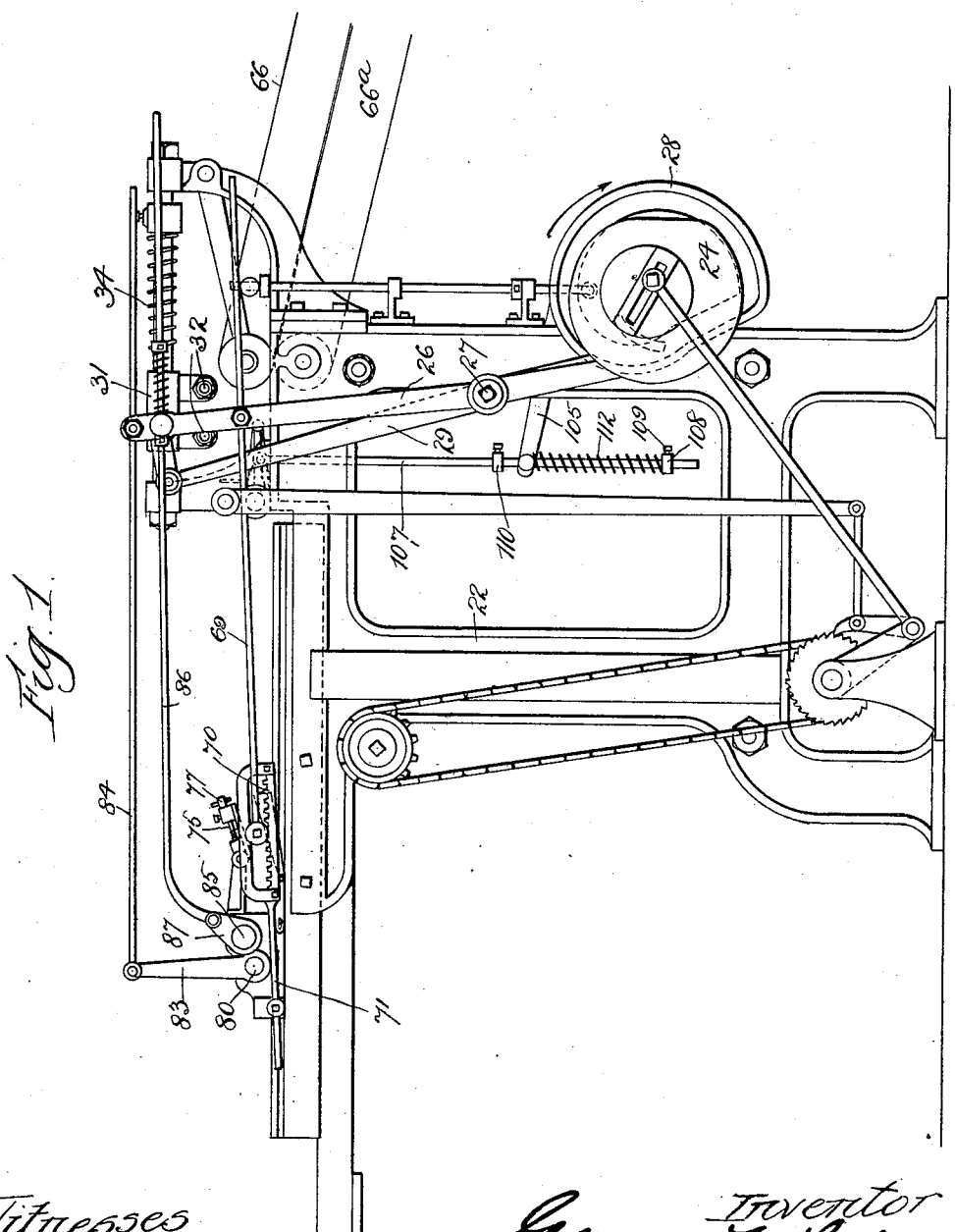
Figure 2:
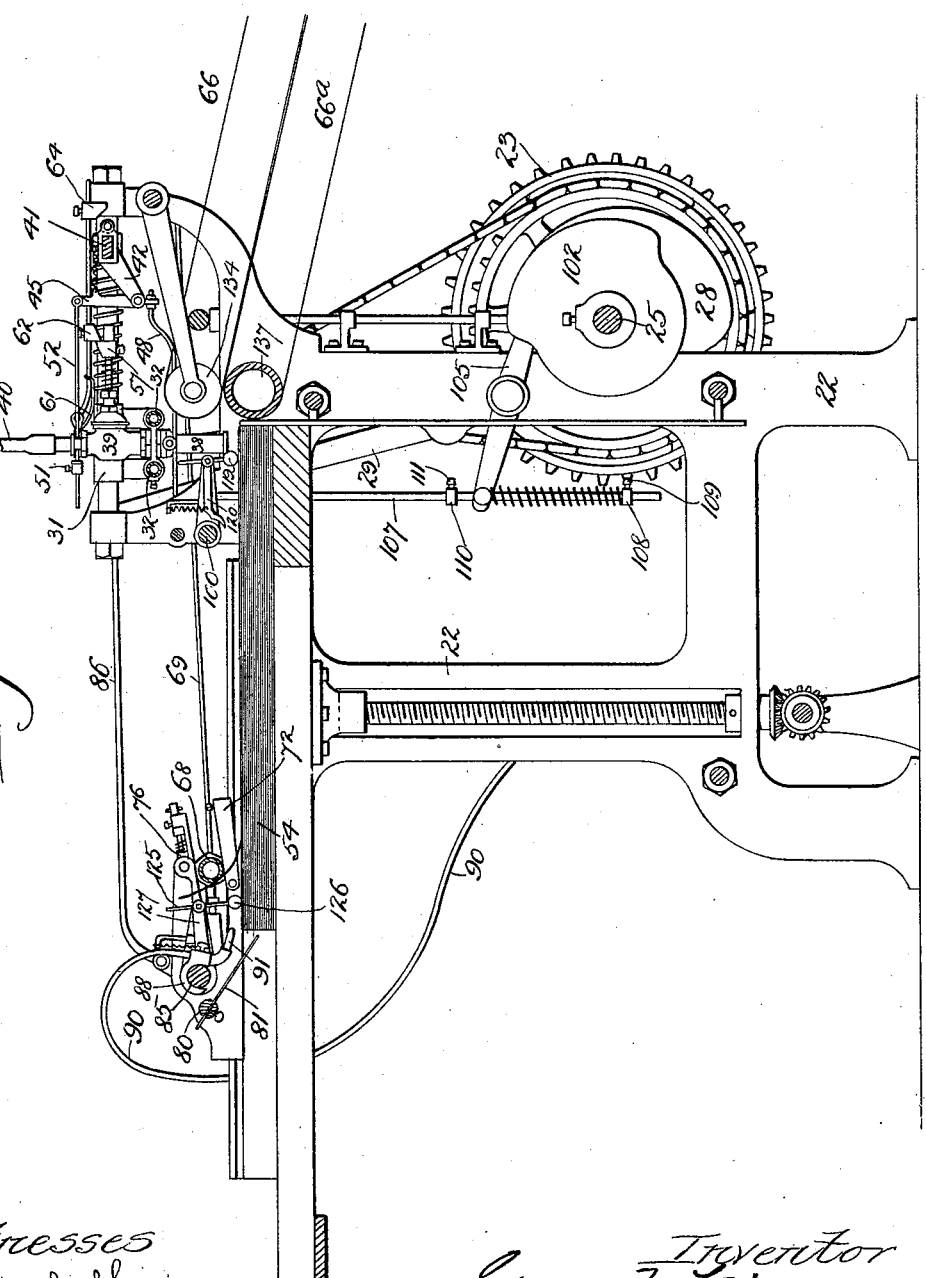
Figure 3:
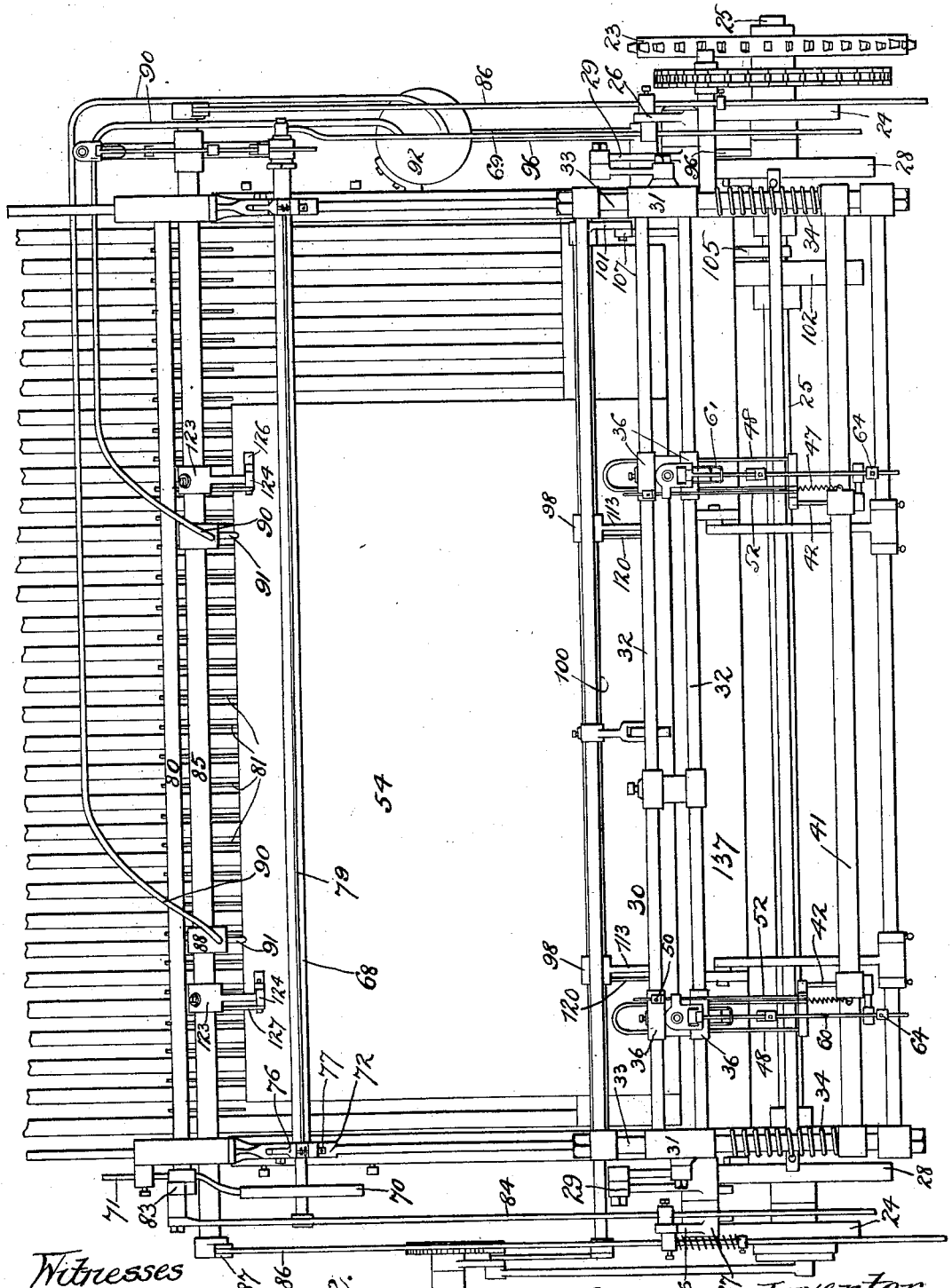
Figure 15:
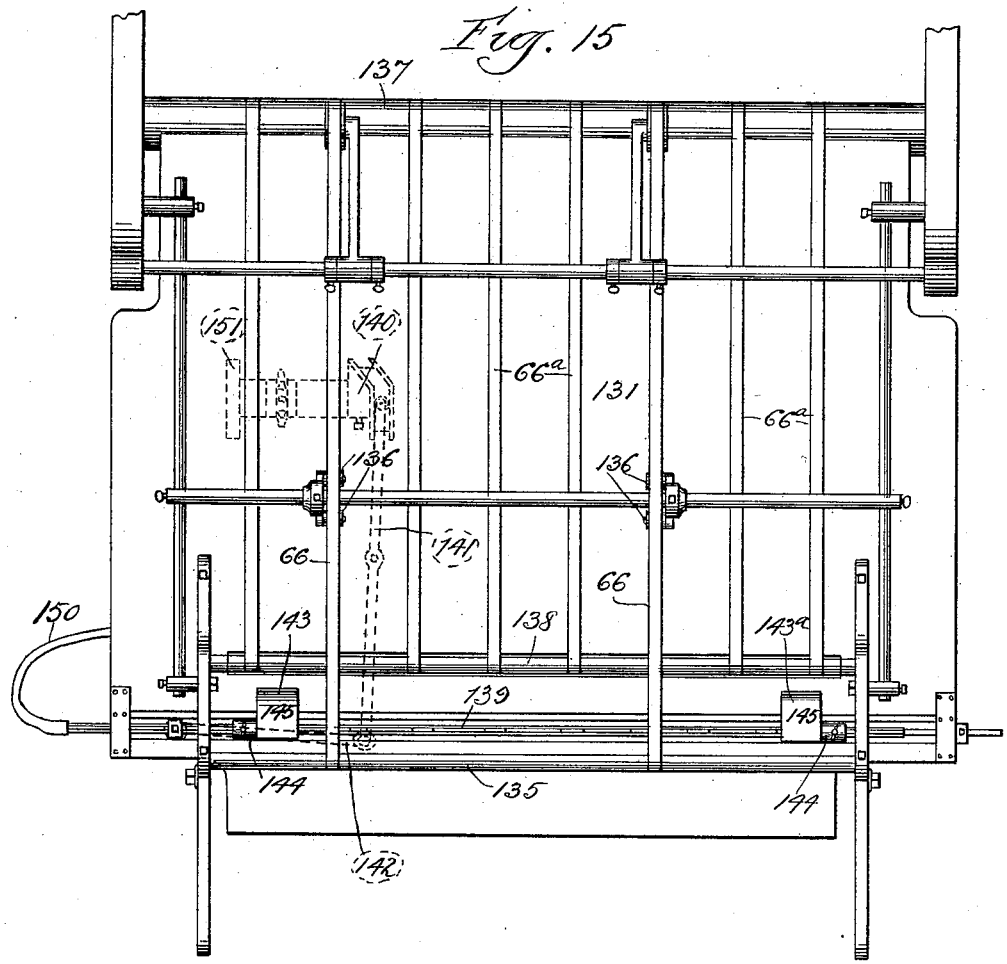
Figure 16:
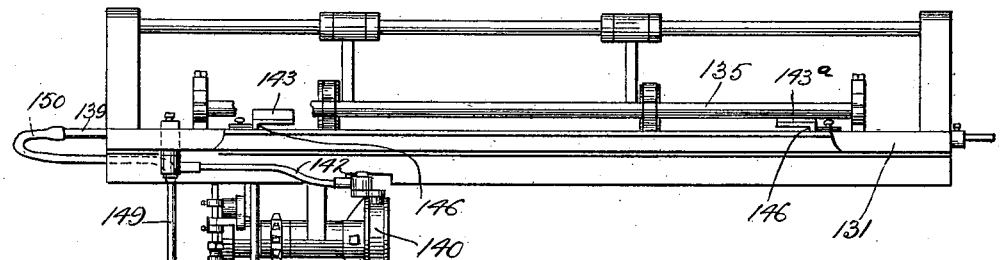

Figure 1 is a side elevation. Fig. 1ª is a longitudinal sectional view of the same. Fig. 2 is a top or plan view. Fig. 3 is an end elevation of the front or delivery end of the machine. Fig. 4 is an enlarged detail of the pneumatic picker. Fig. 5 is an enlarged detail, being a vertical section of the pneumatic picker, showing a portion of the guide. Fig. 6 is an enlarged detail, being a top or plan view of the devices shown in Fig. 4. Fig. 7 is an enlarged detail, being a view of the wheel which regulates the height of the pile of paper and of the mechanism for holding down the front ends of the sheets. Fig. 8 is an enlarged detail, being a view of the device for holding down the front end of the sheet and the cam-and-lever device for operating it. Fig. 9 is an enlarged detail, being a top or plan view of the holding device shown in Fig. 7. Fig. 10 is an enlarged detail, being a view of the air-pump for the blowing mechanism and the cam and lever by which it is operated. Fig. 11 is an enlarged detail, being a view of the holding device by which the rear end of the sheet is held in place and of the blowing-tubes, showing the pneumatic rotating tubes and the shaft to which the devices for raising the end of the pile of sheets are attached in cross-section. Fig. 12 is an enlarged detail, being a view of the guides in which the rotating pneumatic tube travels. Fig. 13 is an enlarged detail, being a cross-section upon line 13 13 of Fig. 12. Fig. 14 is an enlarged detail, being a view of a portion of a pneumatic tube, showing extra slot-openings in said tube covered over with small strips of paper when not in use. Fig. 15 is a top or plan view of the delivery tapes and table, showing the device by which the sheets are caused to register laterally. Fig. 16 is a front elevation of the table shown in Fig. 15. Fig. 17 is a detail longitudinal sectional view of the same, showing also the top of a gripper-cylinder of a printing-press. Fig. 18 is an enlarged detail showing a longitudinal section of a portion of the delivery-table with the cam and lever for operating the valves. Fig. 19 is an end view of the devices shown in Fig. 18, showing a portion of the delivery-table in cross-section. Fig. 20 is an enlarged detail, being a top or plan view of the stop and pneumatic tube for causing the paper to register. Fig. 21 is an enlarged detail, being a vertical longitudinal section on line 21 21 of Fig. 20.

My invention relates to improvements in pneumatic sheet separating and feeding machines, and particularly to improvements upon the devices shown and described in my Letters Patent No. 557,279, dated March 31, 1896.

One of the objects of my invention is to provide mechanism by which sheets of paper may be automatically fed into a printing-press or folder or other machine.

It has for a further object to provide improvements in pneumatic pickers and in guides bearing upon the same, whereby the front end of a sheet of paper may be lifted by pneumatic pressure from a pile of sheets and carried forward until it engages with the tapes or other carrying device of the printing-press or folder and automatically freed and disengaged from said pneumatic pressure at the proper time.

It has for a further object to provide improvements in the mechanism by which the rear end of a sheet of paper upon the top of a pile of paper may be lifted from the sheets below, so as to insure the carrying forward of one sheet only by the pneumatic pickers.

It has for a further object the providing of new and improved means by which the rear end of a sheet of paper, after being seized by a rotating reciprocating pneumatic tube, may be automatically freed from said tube at the proper moment, so that the sheet may be carried forward by pickers engaging the front end of the sheet.

It has for a further object the providing of new and improved means by which the front end of a pile of sheets may be held down while the rear end of the top sheet is engaged and lifted from the pile by a pneumatic tube, whereby drawing back or buckling of the sheet will be prevented.

It has for a further object the providing of new and improved means by which the rear end of a pile of sheets is held down after the rear end of the top sheet has been engaged and lifted free from the rest of the pile by a pneumatic tube and while the pneumatic pickers are engaging the front end of the top sheet and move it forward, thus insuring the delivery of only one sheet by the pneumatic pickers at the front of the machine.

It has for a further object the providing of mechanism by which as the rear end of the top sheet of a pile of sheets is engaged and lifted by pneumatic pressure a blast of air may be blown beneath the top sheet so engaged, thus insuring its separation as a single sheet from the pile.

It has for a further object the providing of new and improved mechanism whereby the sheets, after being delivered by the pneumatic pickers to the tapes and after being carried forward by the tapes, may be caused to register laterally, insuring their proper delivery upon the cylinder of the printing-press.

It has for a further object the improvement of the devices shown and described by me in my previous patent aforesaid in respect to sundry details hereinafter specified.

I accomplish the objects of my invention as illustrated in the drawings and as hereinafter specified.

That which I regard as new will be set forth in the claims.

In the drawings, 22 indicates the framework of the machine, upon which are mounted the devices hereinafter described.

23 indicates a sprocket driving-wheel by which the mechanism is operated.

24 indicates cams which are keyed upon a shaft 25, on which the driving-wheel 23 is also keyed. The cams 24 are provided with suitable cam-grooves in their surfaces for operating the levers hereinafter described.

26 indicates levers which are pivoted to the frame of the machine on a pivot 27. The lower ends of the levers 26 are provided with rollers which engage with the cam-grooves in the cams 24, so as to rock the levers 26.

The levers 26 and cams 24, it is to be understood, are duplicates, one on each side of the machine, and work synchronously.

28 indicates wheels which are provided with suitable cam-grooves and are keyed upon the shaft 25.

29 indicates levers which are pivoted upon the same pivot 27 as the levers 26 and are provided at their lower ends with suitable rollers capable of engaging the grooves in the cam-wheels 28. The cam-wheels 28 and the levers 29 are duplicates, one on each side of the machine, and work synchronously.

30 indicates a carriage consisting of cross-heads 31 and connecting-rods 32, which extend across the machine from side to side. The cross-heads 31 are bored so as to slide freely upon bars 33.

34 indicates spiral springs which are placed upon said bars 33 between the cross-heads 31 and the forward end of the bars 33 upon which they slide, so as to render the motion less abrupt. The upper ends of the levers 29 are pivotally connected with the cross-heads 31, so that as the levers 29 are rocked by the operation of the cams 28 the carriage 30 is reciprocated forward and backward upon the slide-bars 33, the motion being timed as hereinafter described.

Referring now to detail drawings Figs. 4, 5, and 6, 35 indicates pneumatic tubes which are supported upon the carriage 30, one toward each side of the machine. The pneumatic tubes 35 are supported upon the carriage 30 by means of collars 36, which embrace the connecting-rods 32, and one of which is provided with a set-screw 34, by means of which it is secured in place, thus permitting the pneumatic pickers to be adjusted laterally upon the carriage. The pneumatic tubes 35 are provided with telescopic pneumatic pickers 38, which slide vertically upon their lower ends. They are also provided with a valve-chamber 39, in which is mounted a gate-valve of any suitable construction. The upper ends of the pneumatic tubes 35 are connected by flexible tubes 40 with a suitable vacuum-chamber preferably constructed as described in my Letters Patent before referred to.

41 indicates a cross-bar of the framework of the machine. 42 indicates arms projecting downward and backward from said cross-bar 41.

43 indicates a collar which is pivotally mounted upon a pivot 44 at the lower end of the projecting arms 42. This collar 43 is provided with an upwardly-projecting arm 45 and with downwardly-projecting lugs 46.

47 indicates a spiral retractile spring which connects the upper part of the upright arm 45 with the upper end of the arm 42 above the cross-bar 41.

48 indicates a U-shaped guide which is secured to the lugs 46, depending from the collar 43. The guide 48 passes backward, so as to embrace the lower portion of the pneumatic tube 35.

49 indicates rollers, one mounted upon the telescopic pickers 38 and bearing upon the guide 48.

50 indicates a block which is secured by a set-screw 51 to the rear end of an arm 52, the forward end of which is secured to the upper end of the upright arm 45.

53 (see Fig. 6) indicates a lug which projects from the side of the pneumatic tube 35 above the valve 39, so as to engage with the block 50 upon the rod 52. As the carriage carrying the pneumatic picker is moved backward the lug 53 engages with the block 50. As this backward motion proceeds this engagement of the lug 53 with the block 50 oscillates the lever 45 and causes the guide 48 to drop, thus permitting the pneumatic picker 38 to drop by its own weight upon the pile of paper 54 below it. This is so timed that the picker will drop as the carriage reaches the backward limit of its stroke. As the carriage then moves forward the block 50 is freed from engagement with the lug 53 and the retractile spring 47 returns the lever 45 to its original position, thus raising the guide 48 and positively raising the pneumatic telescopic pickers 38 in case the air-pressure, as hereinafter described, should not be sufficient to raise them with the sheet engaged.

The valve in the valve-chamber 39 is provided with a projecting stem 55, which passes through a suitable packing-box 56 in the front of the valve-chamber.

57 indicates a block which is mounted upon the outer end of the valve-stem 55 by means of a set-screw 58.

59 indicates a compression-spring which is interposed between the packing-box 56 and the block 57. The upper surface of the block 57 is beveled downwardly and inwardly toward the valve-chamber.

60 indicates a rod which is pivotally mounted upon the pneumatic tube 35 above the valve 39 and extends forward in front of the cross-bar 41 of the frame.

61 indicates a spring which is secured to the pneumatic tube 35, engaging with the rod 60 and operating to hold it down.

62 indicates a block which is secured to the rod 60 by a set-screw 63. The under surface of the block 62 is beveled upwardly and outwardly to correspond with the bevel upon the upper surface of the block 57.

64 indicates a block which is secured to the forward end of the rod 60 by means of a set-screw 65. Its lower surface is beveled outwardly and downwardly, as shown.

The operation of these devices is as follows: Assuming the devices to be in the position shown in Fig. 4 and moving backward in the direction indicated by the arrow in said figure, the valve is shown closed by the engagement of the rear surface of the block 62 with the front surface of the block 57. As the carriage is carried still further back the beveled surface of the block 64 engages with the forward edge of the cross-bar 41, causing the block 64 to rise and lift with it the rod 60, thus freeing the block 62 from engagement with the block 57. As the block 62 is freed from engagement with the block 57 the coiled compression-spring 59, bearing upon the block 57, throws the valve-stem forward and opens the valve, causing a vacuum in the pneumatic tube 35. These movements are so timed that the valve is opened at the moment when the telescopic picker 38 comes into contact with the upper surface of the top sheet of the pile of paper 54, thus causing the upper sheet to adhere to the pneumatic tube 38 through the action of the vacuum therein. The carriage then begins its forward movement, the telescopic pickers being raised by the action of the vacuum within the tube, assisted by the positive upward motion of the guides 48, as herein described. As the carriage continues its forward movement the forward end of the valve-stem 55 comes in contact with the rear surface of the cross-bar 41, thus pushing the valve-stem backward as the carriage proceeds in its forward motion and closing the valve. During this motion the block 64, carried forward by the same motion of the carriage, is freed from engagement with the cross-bar 41, and the rod 60 being forced downward by the operation of the spring 61 the block 62 is brought into engagement with the block 57, as before. The movements are so timed that the valve is closed at the instant that the forward end of the sheet is delivered between the tapes 66 and 66ª.

The telescopic pickers 38 are provided with small holes 67, which are not large enough to prevent a sufficient vacuum being produced in the pneumatic tube 35 to raise the sheet when the valve is open, but which are sufficient to admit air into the tube as soon as the valve is closed, as above described, thus allowing the forward end of the sheet to be freed from the operation of the pickers.

Coming now to a description of the devices adapted to engage the rear ends of the sheets and assist and insure the operation of the pickers, 68 (see Figs. 11 and 12) indicates a rotating reciprocating pneumatic tube which is carried upon the machine in the same way as the tube described in my patent above referred to and is rotated in the same manner. The tube 68 is reciprocated by means of connecting-rods 69, which are pivotally connected with the levers 26 and with each end of the pneumatic tube in the same manner as described in my patent aforesaid. The tube 68 is rotated, as it is reciprocated, by means of a rack-bar 70 and ratchet-wheel in the same manner as described in my said patent, the rack-bar 70 being carried by a rod 71, which is pivotally connected with the frame of the machine, so as to allow an up-and-down motion of said rack-bar.

72 (see Fig. 12) indicates inclined guides pivotally mounted upon the frame of the machine and forming a track upon which the pneumatic tube 68 moves. The pitch of the incline of the guides 72 is regulated by set-screws 73, which bear upon the framework of the machine.

74 indicates an upper inclined guide which is mounted upon the frame of the machine in any suitable manner. The upper inclined guide 74 carries a spindle 75, mounted in suitable bearings 76 and provided with a head and cross-handle 77, by which it may be turned.

78 indicates a set-screw by which the spindle 75 is held in place.

It is understood, of course, that the guides 72 74 are duplicated, one upon each side of the machine.

79 indicates a wire which is secured at each end to the spindle 75 and extends across the machine from side to side, the wire being tightened by turning the spindles 75 in their bearings.

The pneumatic tube 68 is provided with tubes connecting with a vacuum-chamber and with automatically-operating valves which open and close said tube 68 in the same manner as described in my patent referred to. As the pneumatic tube 68, after having engaged the paper as described in my said patent, is moved forward in the manner therein described it moves upward between the inclined guides 72 and 74. As it moves upward the free end of the sheet, as shown in Fig. 11, comes in contact with the wire 79, which, as the forward and slightly upward movement of the pneumatic tube 68 continues, strips the paper from the pneumatic tube, the movement being so timed that the wire will come in contact with the free end of said sheet at the moment when the vacuum is shut off from the tube 68 in the manner described in my said patent and at the same moment when the pneumatic pickers in the front of the machine engage the front end of the sheet to move it forward.

80 indicates a rock-shaft extending across the machine from side to side in the rear of the pile of sheets. The rock-shaft 80 is provided with a number of small rods 81, which are secured in it by set-screws 82 and are adapted to bear against the rear end of the pile of sheets and raise the same against the pneumatic tube 68 as the shaft is rocked. The shaft 80 is rocked by means of an arm 83, keyed thereto, (see Fig. 1,) which is pivotally connected by a rod 84 with the upper end of the lever 26. The rocking of shaft 80 is so timed that the rods 81 will be brought in contact with the rear end of the pile of sheets and lift them into contact with the pneumatic tube 68 at the moment when the pneumatic tube 68 reaches the extreme limit of its backward motion. The tube 68 is operated, as has been above stated, in the same manner as described in my patent aforesaid, and the rods 81 raise the ends of the sheets against said tube in the same general manner and with the same effect as the devices shown in said patent, and as no claims are made in this application for either of these devices it is not necessary to describe them further here.

85 indicates a rock-shaft journaled in suitable bearings in the framework of the machine and extending across the same from side to side. The shaft 85 is rocked by means of connecting-rods 86, pivotally connected to arms 87, keyed upon the outer ends of said rock-shaft 85 and to the upper portion of the lever 26.

88 indicates collars which are secured to the rock-shaft 85 by means of set-screws 89.

90 indicates air-tubes which are provided with nozzles 91 and are mounted in said collars 88. The tubes 90 are flexible and are connected with an air-pump, which is shown in detail in Fig. 10.

Referring to Fig. 10, 92 indicates an air-pump, of any preferred construction, which it is not necessary to describe here. The air-pump 92 is mounted upon the framework of the machine in any suitable place.

28 indicates a cam provided with a cam-groove 94 and secured to a shaft 25, which, as shown, is the main driving-shaft of the machine.

96 indicates a lever which is pivotally mounted in the framework of the machine and bears at one end a roller 97, adapted to engage with the cam-groove 94, and at the other end is pivotally connected with the piston of the air-pump 92. As the rock-shaft 85 is rotated the nozzles 91 are moved up and down with it. The cam by which the air-pump is operated is so timed that a blast of air will be blown by the air-pump through the tubes 90 and through the nozzles 91 at the moment when the parts are in the relation shown in Fig. 11—that is to say, after the pneumatic tube has engaged the sheet and lifted its rear end upward—thus blowing a blast of air under the single sheet so lifted and aiding to insure separation of the single sheet by the forward pickers, as above described.

98 indicates collars which, by means of set-screws 99, are keyed to a rock-shaft 100, extending across the machine from side to side near the front of the machine and back of the forward edge of the pile of sheets.

101 indicates a crank-arm which is keyed to the rock-shaft 100.

102 indicates a cam provided with a cam-groove 103 and keyed upon the shaft 25, which is journaled in the framework of the machine and is driven from the main driving-wheel by suitable connections.

105 indicates a lever which is pivoted to the framework of the machine and is provided at one end with a roller 106, which engages with the cam-groove 103.

107 indicates a rod the upper end of which is pivotally connected with the arm 101 and the lower end of which is provided with a block 108, secured to it by means of a set-screw 109. As best shown in Fig. 8, the rod 107 extends downward below the table, upon which the pile of sheets is placed.

110 indicates a second block which is secured to the rod 107 by means of a set-screw 111 at a suitable distance above the lower block 108. 112 indicates a spiral spring which is mounted upon said rod 107 above the block 108. The forward end of the lever 105 is adapted to bear upon the upper end of the spiral spring 112 and against the block 108, so as to reciprocate said shaft 107 vertically and thus rock the rock-shaft 100.

Referring to Figs. 7 and 9, the collars 98 are provided with forwardly-projecting arms 113, preferably formed integral therewith. The forward portion of the arms 113 bears a collar 114, preferably formed integral therewith. The collar 114 carries a pin 115, adapted to oscillate therein.

116 indicates a head which is secured to one end of the pin 115.

117 indicates a pin which rocks when the pin 115 oscillates. This pin 117 passes through the head 116 and is secured therein by means of a set-screw 118.

119 indicates a roller, preferably of rubber or some similar material, which is mounted upon the lower end of the pin 117.

120 indicates an arm which is rigidly secured to the other end of the pin 115 and projects rearward toward the collar 98, being provided at its rear end with a surface adapted to bear against said collar 98, as best shown in Fig. 7.

121 indicates an upright pin which is mounted in the arm 113 and carries spiral spring 122, the lower end of which is secured to the rear of the arm 120.

The object of the devices last described is to hold down the forward end of the pile of sheets while the pneumatic tube 68 is engaging the rear end of the top sheet, so as to prevent the top sheet from being pulled backward or buckling as the tube 68 engages it and also to insure the separation of the top sheet from the pile of sheets, as will more fully hereinafter appear. The movement of the rock-shaft 100 is so timed that the rollers 119 are brought down upon the pile of sheets at the moment when the pneumatic tube 68 at the rear limit of its motion engages the rear end of the top sheet of the pile. As the arm 113 is swung around by the motion of the rock-shaft 100 its outer end of course describes the arc of a circle, and this would cause the rollers 119 to push slightly backward upon the pile of sheets if it were rigidly connected with said arm, especially as the pile of sheets will always yield somewhat under pressure of the rollers. With the construction above described, however, as the rollers are brought in contact with the pile of sheets and the pile yields somewhat under them the rollers are thrown slightly forward, rocking the pin 115 and the arm 120 against the action of the spring 122, causing the rod 117 to assume a substantially vertical position, as shown in Fig. 7. As above stated, this prevents the throw of the sheet backward and prevents its buckling when engaged by the pneumatic tube and also insures the separation of the top sheet from the pile of sheets.

The action of the rock-shaft 100 and the cam 102 and its connections with said rock-shaft is so timed, as above stated, as to bring the rollers 119 down upon the forward end of the pile of sheets at the moment when the pneumatic tube 68 engages the rear end and to lift said rollers 119 from the forward end of the pile of sheets at the moment when the pneumatic pickers engage with the free end of the sheet to move it forward.

Upon the rock-shaft 85 are mounted collars 123, which carry forwardly-projecting arms 124, upon which are mounted the rocking pins 125, rollers 126, and arms 127. The construction of these pins, rollers, and arms is exactly the same as the rods 117, collars 98 and arms 113, and the rollers 119, and operate in exactly the same way, and it is therefore not necessary to describe them again in detail. These parts 123, 124, 125, 126, and 127, however, are mounted upon the rock-shaft 85 and are so arranged upon said shaft that as said shaft rocks the rollers 126 will be brought down upon the rear end of the pile of sheets after the pneumatic tube 68 has engaged with and lifted away from these devices the rear end of the top sheet of the pile and just before the pneumatic pickers at the front portion of the machine engage with the front end of the top sheet, thus holding down the entire pile of sheets, except the top sheet, and insuring the carrying of only one sheet by the pneumatic pickers.

Referring to Fig. 14 and the portion of the pneumatic tube therein shown, in addition to the ordinary openings 128 the pneumatic tube is provided with openings 129 in the form of slots. For ordinary work the small round openings 128 will be sufficient, but in heavier work it will be found necessary to use different-shaped openings. I have therefore provided the pneumatic tube 68 with these slots 129, which when not in use are covered by pieces of paper 130 or similar air-excluding material pasted over said slots.

The general operation of the mechanism shown for the delivering of the sheets to the tapes is the same as that described in my patent above referred to. The differences between the operation of the above-mentioned parts and the operation described in said patent are differences in details and have been fully described above, each in its proper place.

Referring now to Figs. 15, 16, 17, 18, 19, 20, and 21, these figures illustrate my improved mechanism for causing the sheets to register laterally when delivered to a printing-press or similar mechanism. As the sheets which are delivered sometimes vary in width and as they do not always come out in exactly the same place, it is obvious that if fed into a printing-machine they will have to be adjusted by hand, so that they will register laterally with the machine, unless some mechanism is provided for that purpose. It is to provide means for automatically causing said sheets to register that the following-described portion of my invention has been devised.

131 indicates a delivery-table over which the tapes 66 66ª pass, between which the sheets, after being delivered to the tapes by the pneumatic mechanism above described, are carried. The lower end of the delivery-table is provided across its upper surface with a recess designed to receive and accommodate a pneumatic tube 139, hereinafter explained.

132 indicates one of the cylinders of a printing-press or similar mechanism provided with any well-known form of grippers 133, which may be operated in any well-known and approved manner.

The upper tapes 66 pass around rollers 134 135 and over rollers 136, so that the forward portion of said upper tapes comes a little distance above the upper surface of the table 131. The lower tapes 66ª pass around rollers 137 138. The rollers 138 are located near the lower or forward end of the table 131, as shown in Fig. 17, and are placed within said table, so that the upper portion of said lower tapes 66ª passes above and the lower below said table 131, as shown in Fig. 17.

139 indicates a pneumatic tube, which is provided in its upper surface with a number of openings and mounted near the lower forward end of the table 131, so as to move laterally from side to side.

140 indicates a wheel having a cam-groove in its periphery, which is best shown in Fig. 15. The wheel 140 is mounted below said table 131 and is driven by suitable connections with the main driving-shaft of the machine.

141 indicates a lever pivoted so as to swing horizontally below said table, as best shown in Fig. 15 by dotted lines. The rear end of said lever is provided with a roller which engages with the cam-groove in the periphery of the wheel 140, and the forward end is pivotally connected by a link 142 with the pneumatic tube 139. As said wheel is rotated the lever 141, being oscillated by the cam-wheel 140, moves the pneumatic tube 139 longitudinally of its axis and from side to side of the table 131.

143 143ª indicate stops, which are mounted upon the pneumatic tube 139 by means of collars 144, secured to the pneumatic tube by set-screws and adjustable longitudinally on said tube. These stops are provided with overhanging top portions 145, beneath which the edge of the sheet of paper will come, and with bearings 146, against which the edge of the paper may bear, as hereinafter described and as best shown in Fig. 16. The upper portions 145 of the stops are arranged above the level of the table 131, while the collars 144 are pendent, so that they may connect with the tube 139 in the recess of the table.

147 indicates a tube connected with any suitable vacuum-chamber, which, being of any well-known form, is not shown or described. It may be connected with the same vacuum-chamber with which the pickers and rotating pneumatic tube above described are connected. The tube 147 is provided with a valve-chamber 148, which is fitted with an ordinary gate-valve of any approved form and construction. From the other side of the valve-chamber 148 leads a tube 149, which is connected by a flexible tube 150 with one end of the vacuum-tube 139.

Referring to Figs. 18 and 19, which best show the construction, 151 indicates a cam keyed to a shaft 152, journaled in suitable bearings upon supports 153, secured to and extending downward from the table 131. The shaft 152 is driven by any suitable connection from the main driving-shaft of the machine.

154 indicates a lever which is pivotally mounted upon a support 155 below the delivery-table 131. One end of the lever carries a roller 156, which bears upon the cam 151, and the other end is pivotally connected with a valve-stem 157 of the gate-valve working in the valve-chamber 148.

158 indicates a contractile spring which is secured at one end below the delivery-table 131 and at the other end to the lever 154 at a suitable point between its pivot and its connection with the valve-stem 157. As the cam 151 rotates and oscillates the lever 154 the gate-valve in the valve-chamber 148 is alternately opened and closed. The cam 151 and lever 154 are timed to operate as hereinafter described.

The operation of these registering devices is as follows: The sheet of paper, after being delivered between the delivery-tapes 66 66ª, is carried down the delivery-table 131 by said tapes until its lower and forward edge extends just over the lower and forward edge of the delivery-table 131 in position to be seized by the grippers 133. As the paper reaches this position the pneumatic tube 139 is at the end of its longitudinal movement laterally of the table toward the left in Fig. 15, the cam 140 and lever 141 being so arranged as to bring the tube to this position at this time. As soon as the sheet of paper has reached this position the cam 140 and lever 141 are so timed as to begin to move the tube 139 toward the right of said Fig. 15. As the tube moves toward the right the stop 143 comes over the left-hand edge of the paper, and its side bearing-surface 146, being brought into contact with the edge of the paper, moves the sheet of paper bodily with the pneumatic tube 139 to the right. During this time the gate-valve in the chamber 148 is closed, so that there is no vacuum in the tube 139. The cam 151 and lever 154 are so timed that as soon as the tube 139 has reached the limit of its movement to the right the gate-valve in the valve-chamber 148 will be opened, causing a vacuum in the tube 139. This causes the sheet of paper to adhere to the pneumatic tube 139 and to be carried with it to the left as the tube moves back toward the left in its reciprocating movement. The stop 143 is so placed upon the tube 139 that when said tube has reached the limit of its movement to the left, the left-hand edge of the sheet of paper being in contact with the side bearing 146 of said stop 143, the sheet of paper will be in register laterally with the printing-cylinder 132. At this point, as above described, the cam 151 and lever 154 operate to close the gate-valve in the chamber 148, and at the same time the grippers 133 are so arranged as to seize the forward edge of the sheet and, the cylinder 132 rotating in the direction indicated by the arrow thereon in Fig. 17, strip the sheet of paper from the pneumatic tube 139.

The cylinder 132 and grippers 133 may be of any well-known and approved form and operate in any approved manner, and hence they are not further described here.

In case it is desired to make the sheet of paper register toward the right instead of toward the left then the stop 143ª is used, the operations of the tube above described being exactly the reverse of the described operations, so as to carry the sheet first toward the left and then, by the operation of the vacuum in the tube 139, again toward the right, the cam 151 and lever 154 being so arranged as to open the gate-valve in the chamber 148 when the tube is at the right-hand limit of its motion and close it when it is at the left-hand limit instead, as above described.

It is to be understood that throughout this specification the words "forward" and "front" mean toward the right of Fig. 1 and that the words "backward," "rearward," and "rear" mean toward the left of Fig. 1.

Referring to the devices which hold down the front and rear ends of the sheets, it will be seen by reference to Figs. 11 and 12 that as the rotating pneumatic tube 68 is moved forward it is raised by the action of the inclined guides 72 and is rotated by the rack-bar 70. (Shown in Fig. 1. The teeth upon the rack-bar 70 are so arranged as to wind the paper upon the tube slightly faster than the tube 68 moves forward, thus pulling the sheet taut. This is especially useful when stiff sheets of paper are being manipulated, as otherwise the sheet would tend to spring away from about the tube. If the front ends of the sheets were not held down while the tube 68 is being rotated, the front edge of the top sheet would be pulled away from the front edge of the pile, and when the pneumatic pickers descend to engage with the sheet the latter might be drawn back so far that the pickers would miss it altogether and engage the sheet below or engage partly with one and partly with another sheet; but by holding down the front edge of the sheet by the action of the holders or rollers 119 while the sheet is being tightened or pulled taut by the action of the tube 68, as above set forth, the entire top sheet is lifted in a straight line from the holders or rollers 119 to the pneumatic tube, thus insuring the complete separation of the top sheet from the sheet below, so that the pneumatic pickers when they engage the top sheet will carry forward this sheet only. If the front holders or rollers were not provided, the top sheet would tend to lie with its forward portion, throughout a part of its length, closely upon the sheet below, while only the rear portion would be lifted by the pneumatic tube 68. It will be obvious, therefore, that while the rear pickers operate only to hold down the lower sheets while the top sheet is being slid off from the pile by the pneumatic pickers in front the front pickers hold down the entire pile of sheets, the top sheet included, thereby insuring the proper action of the pneumatic tube and of the entire machine.

That which I claim as my invention, and desire to secure by Letters Patent, is—

1. The combination with a carriage, mechanism for reciprocating said carriage, a telescopic pneumatic picker carried by said carriage, a valve controlling said pneumatic picker, and mechanism adapted to automatically open and close said valve as said carriage is reciprocated, of guides bearing upon said pneumatic picker and automatically operated by the reciprocation of said carriage to positively raise said telescopic picker as said carriage reciprocates, substantially as described.

2. The combination with a carriage, mechanism for reciprocating said carriage, a telescopic pneumatic picker carried by said carriage, a valve controlling said pneumatic picker, and mechanism adapted to automatically open and close said valve as said carriage is reciprocated, of oscillating guides bearing upon said picker, and mechanism adapted to automatically oscillate said guides as said carriage reciprocates and positively raise said picker as said carriage moves forward, and permit it to drop as it reaches the backward limit of its motion, substantially as described.

3. The combination with a frame, a carriage carried on said frame, mechanism for reciprocating said carriage, a pneumatic telescopic picker carried by said carriage, a valve controlling said pneumatic picker, and mechanism adapted to automatically open and close said valve as said carriage is reciprocated, of guides 41 pivotally mounted upon said frame and bearing upon said telescopic picker, a spring bearing upon said guides and adapted normally to oscillate the same upward and positively raise said picker, and mechanism connected with said guides and adapted to automatically oscillate said guides downward as said carriage nears the backward limit of its reciprocating movement, permitting the telescopic portion of said picker to drop, substantially as described.

4. The combination with a frame, a carriage carried on said frame, and mechanism for reciprocating said carriage, of a telescopic picker carried by said carriage and having a valve-chamber, a gate-valve located in said valve-chamber and provided with a forwardly-projecting stem, a beveled block 57 adjustably carried by said stem, a spring 59 bearing on said block and adapted normally to open said valve, a cross-bar adapted to close said valve as said carriage moves forward, a rod 60 pivotally mounted on said picker, a spring 61 bearing upon said rod 60 and operating normally to hold said rod down, a beveled block 62 adjustably mounted on said rod 60 and adapted to engage with said beveled block 57 and hold said valve closed during the backward movement of said carriage, and a beveled block 64 adjustably mounted upon the forward end of said rod 60 and adapted to bear against said cross-bar and raise said rod 60 as said carriage reaches the backward limit of its movement, substantially as described.

5. The combination with pneumatic pickers for engaging the front end of a sheet of paper and moving it forward, and a coacting, rotating, reciprocating pneumatic tube, provided with a series of openings and adapted to engage and raise the rear end of a sheet, of a rock-shaft having an arm, an oscillatory pin mounted in said arm, a pin connected with the oscillatory pin and provided with a head for holding the rear end of a sheet, an arm connected with the oscillatory pin, and a spring connected with the lever, substantially as and for the purposes described.

6. The combination with pneumatic pickers for engaging the front end of a sheet of paper for moving it forward, and a coacting, rotating, reciprocating pneumatic tube, provided with a series of openings and adapted to engage and raise the rear end of a sheet, of automatically-operated, spring-adjustable holders for holding down the rear end of a pile of sheets after the rear end of the top sheet has been lifted and moved forward by said pneumatic tube, mechanism for automatically forcing said holders down upon the pile of sheets after the pneumatic tube has engaged with the rear end of the top sheet and moved it forward, and raising said holders from the pile of sheets after the top sheet has been freed from the pneumatic tube, and blowers mounted independent of said spring-adjusted holders at a point in rear of the same for blowing a current of air beneath the top sheet as the rear end is lifted by the pneumatic tube, substantially as and for the purposes described.

7. The combination with pneumatic pickers adapted to engage the front end of the top sheet of a pile of sheets and move it forward, a coacting, rotating, reciprocating pneumatic tube, provided with a series of openings, and adapted to engage and raise the rear end of a sheet, mechanism for rotating and reciprocating said tube, and mechanism adapted to alternately raise the rear end of said pile of sheets against said rotating and reciprocating tube as said tube reaches the backward limit of its motion, and to allow the same to drop back to its normal position after the rear end of said top sheet is engaged with said tube, of automatically-operated spring-adjusted holders adapted to hold down the rear end of a pile of sheets after the rear end of the top sheet has been lifted and moved forward by said tube, mechanism adapted automatically to force said holders down upon said pile of sheets after said tube has engaged with the rear end of the top sheet and moved it forward, and to raise said holders from said pile of sheets after the top sheet has been freed from said tube, blowers mounted independent of the said spring-adjusted holders, for blowing a current of air beneath said top sheet as the rear end is lifted by said rotating reciprocating tube, and mechanism adapten to intermittently blow a blast of air through said blowers as said pneumatic tube engages and raises the rear end of said top sheet, substantially as described.

8. The combination with pneumatic pickers adapted to engage the forward end of the top sheet of a pile of sheets and carry it forward, and mechanism for operating the same, of a coacting rotating reciprocating pneumatic tube adapted to engage the rear end of a sheet of paper and lift the same from the pile, said tube being provided with a series of openings, mechanism for rotating and reciprocating said tube, automatically-operated holders adapted to alternately press upon and hold the front end of the pile of sheets down while said rotating and reciprocating tube engages the rear end of the top sheet, and to rise from said pile of sheets as said pickers engage the forward end, and mechanism for operating said holders, substantially as described.

9. The combination with pneumatic pickers adapted to engage the forward end of the top sheet of a pile of sheets and carry it forward, and mechanism for operating the same, of a coacting rotating reciprocating pneumatic tube adapted to engage the rear end of a sheet of paper and lift the same from the pile, said tube being provided with a series of openings, mechanism for rotating and reciprocating said tube, automatically-operated holders adapted to alternately bear upon and press down the front end of a pile of sheets while said rotating and reciprocating tube engages the rear end of the top sheet, and to rise from said pile of sheets as said pickers engage the forward end, mechanism for operating said holders, automatically-operated holders adapted to alternately bear upon and press down the rear end of a pile of sheets after the rear end of the top sheet has been engaged and lifted by said rotating reciprocating tube and while the forward end of said top sheet is engaged with and carried forward by said pickers, and to be lifted from said pile of sheets as said rotating reciprocating tube reaches the backward limit of its movement, and mechanism for alternately raising and lowering said last-mentioned holders, substantially as described.

10. The combination with mechanism adapted to engage the front end of a sheet of a pile of sheets and move it forward, a coacting rotating reciprocating pneumatic tube provided with a series of openings and adapted to engage the rear end of the top sheet of said pile a short distance in front of its rear edge, and mechanism for rotating and reciprocating said tube, of inclined guides adapted to bear upon said rotating reciprocating tube from below and cause the same to rise as it moves forward, and a wire stretched transversely over the pile of sheets and supported above the pneumatic tube to engage the free rear end of said upper sheet as said rotating reciprocating tube moves forward and strip said sheet from said tube, substantially as described.

11. In a pneumatic sheet separating and feeding machine, the combination with a rock-shaft, and mechanism for rocking said shaft, of an arm 113 keyed to said rock-shaft, a pin 115 pivotally carried in the outer end of said arm, an upright pin 117 adjustably mounted on said pin 115, holders 119 carried upon the lower end of said pin 117, a lever 120 secured to said pin 115, and a spring mounted upon said arm 113 and bearing upon said lever 120, and adapted normally to raise said lever 120, substantially as described.

GEORGE F. LEIGER.

Witnesses:
ALBERT H. ADAMS,
JOHN L. JACKSON.